US011934146B2

(12) United States Patent
Ohmori et al.

(10) Patent No.: US 11,934,146 B2
(45) Date of Patent: Mar. 19, 2024

(54) TONER AND METHOD FOR PRODUCING TONER

(71) Applicant: CANON KABUSHIKI KAISHA, Tokyo (JP)

(72) Inventors: Atsuhiko Ohmori, Kanagawa (JP); Takaaki Furui, Tokyo (JP); Yasuhiro Hashimoto, Shizuoka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 255 days.

(21) Appl. No.: 17/398,875

(22) Filed: Aug. 10, 2021

(65) Prior Publication Data

US 2022/0066339 A1 Mar. 3, 2022

(30) Foreign Application Priority Data

Aug. 26, 2020 (JP) ................................ 2020-142844
Jul. 19, 2021 (JP) ................................ 2021-118784

(51) Int. Cl.

*G03G 9/087* (2006.01)
*G03G 9/08* (2006.01)
*G03G 9/097* (2006.01)

(52) U.S. Cl.

CPC ....... *G03G 9/08711* (2013.01); *G03G 9/0804* (2013.01); *G03G 9/0819* (2013.01); *G03G 9/08755* (2013.01); *G03G 9/08782* (2013.01); *G03G 9/09708* (2013.01)

(58) Field of Classification Search

CPC ......................... G03G 9/0825; G03G 9/08782
See application file for complete search history.

(56) References Cited

U.S. PATENT DOCUMENTS

2017/0227873 A1* 8/2017 Sugawara .......... G03G 9/08782
2018/0196368 A1* 7/2018 Tsuchihashi ....... G03G 9/09378

FOREIGN PATENT DOCUMENTS

JP 2016062041 A 4/2016
JP 2016224248 A 12/2016
JP 2019-015957 * 1/2019 ............. G03G 9/083

OTHER PUBLICATIONS

Translation of JP 2019-015957.*

* cited by examiner

*Primary Examiner* — Peter L Vajda
(74) *Attorney, Agent, or Firm* — CANON U.S.A., INC. IP Division

(57) ABSTRACT

A toner comprises a toner particle containing a resin component and a wax; and an inorganic fine particle on a surface of the toner particle, wherein in the cross section of the toner particle, domains including the wax are present in a region ranging from a surface of the toner particle to a depth of 600 nm from the surface, wherein when a percentage ratio of sum of areas of all the domains in the region with respect to an area of the region is R2, and when a percentage ratio of sum of areas of the domains having a major diameter of 10 to 120 nm in the region with respect to the area of the region is R1, R1 and R2 satisfy the following formulae (1) and (2):

$$2.0 \leq R1(\%) \leq 15.0 \quad \text{formula(1)}$$

$$R1(\%)/R2(\%) \geq 0.60 \quad \text{formula (2).}$$

13 Claims, 3 Drawing Sheets

TONER AND METHOD FOR PRODUCING TONER

BACKGROUND

The present disclosure relates to a toner for use in an electrophotographic image-forming apparatus.

DESCRIPTION OF THE RELATED ART

In recent years, there has been an increasing demand for power saving in electrophotographic image-forming apparatuses. To satisfy the demand for power saving, toners with superior low-temperature fixability, which can be fixed to a medium, such as paper, even at low temperatures, have been studied.

A method for lowering the glass transition temperature of a resin component of a toner is known to improve the low-temperature fixability of the toner. When paper left in a normal-temperature and high-humidity environment is used, however, part of the heat quantity necessary for fixing is used to evaporate water from the paper, and an insufficient heat quantity is often supplied to toner. Consequently, a higher fixing temperature is often required to fix toner, thus making low-temperature fixing difficult. When the glass transition temperature of a resin component of a toner is excessively lowered, however, the toner has lower high-temperature storage stability. Thus, there is a demand for another method contributing to improved low-temperature fixability of toner.

Accordingly, to improve the low-temperature fixability of toner, a toner has been studied in which a toner particle can melt easily near its surface so that the entire toner particle can melt rapidly when fixed. A toner that contains wax unevenly distributed near the surface of a toner particle is proposed in Japanese Patent Laid-Open Nos. 2016-62041 and 2016-224248. The wax near the surface of the toner particle can easily and rapidly melt resin near the surface of the toner particle at the time of fixing, and superior low-temperature fixability can be achieved even when a sheet left in a normal-temperature and high-humidity environment is used.

However, the present inventors have examined toners disclosed in Japanese Patent Laid-Open Nos. 2016-62041 and 2016-224248 and found that fixed images tend to have a lack in image during long image output in a high-temperature and high-humidity environment.

SUMMARY

At least one aspect of the present disclosure is directed to providing a toner that can have superior low-temperature fixability when a sheet left in a normal-temperature and high-humidity environment is used and that is less likely to cause a lack in a fixed image during long image output in a high-temperature and high-humidity environment.

According to one aspect of the present disclosure, there is provided a toner containing:

a toner particle containing a resin component and a wax; and an inorganic fine particle on a surface of the toner particle, wherein in the cross section of the toner particle, domains including the wax are present in a first region ranging from a surface of the toner particle to a depth of 600 nm from the surface, wherein when a percentage ratio of sum of areas of all the domains present in the first region with respect to an area of the first region is defined as R2, and when a percentage ratio of sum of areas of the domains having a major diameter of 10 to 120 nm present in the first region with respect to the area of the first region is defined as R1, R1 and R2 satisfy the following formulae (1) and (2):

$$2.0 \leq R1(\%) \leq 15.0 \qquad \text{formula (1)}$$

$$R1(\%)/R2(\%) \geq 0.60 \qquad \text{formula (2).}$$

The present disclosure can provide a toner that can have superior low-temperature fixability when a sheet left in a normal-temperature and high-humidity environment is used and that is less likely to cause a lack in a fixed image during long image output in a high-temperature and high-humidity environment.

Further features of the present disclosure will become apparent from the following description of exemplary embodiments with reference to the attached drawings.

DESCRIPTION OF THE EMBODIMENTS

Figure 1:
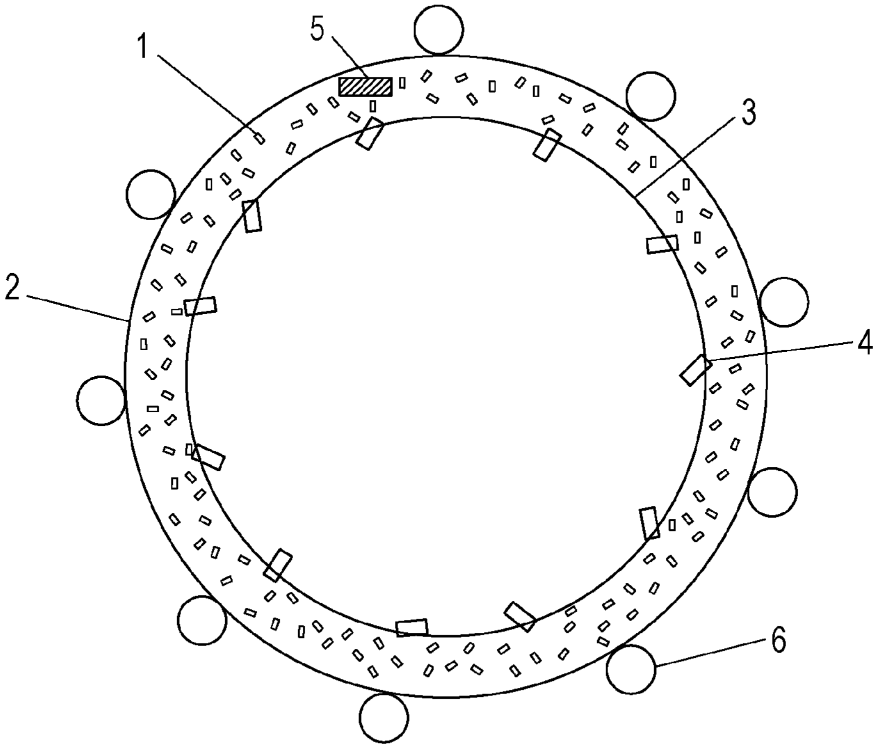
FIG. 1 is a schematic view of a cross section of a toner particle for explaining a postulated mechanism offering advantages of the present disclosure.

Unless otherwise specified, the numerical range " . . . or more and . . . or less" or " . . . to . . . " refers to the numerical range including the lower and upper limits.

An observation in a cross section of a toner particle according to the present disclosure can be an observation in a cross section of a toner particle with a scanning transmission electron microscope.

The term "wax domain", as used herein, refers to a domain including a wax. The term "small domain", as used herein, refers to a wax domain having a major diameter of 10 to 120 nm. The term "coarse wax domain", as used herein, refers to a wax domain having a major diameter of more than 120 nm.

<Causes of Lack in Image in High-Temperature and High-Humidity Environment, and Circumstances Leading Up to Present Disclosure>

The reason for a lack in a fixed image during long image output in a high-temperature and high-humidity environment using a toner according to Japanese Patent Laid-Open Nos. 2016-62041 and 2016-224248 may be as described below.

A toner particle containing wax dispersed near its surface tends to be a toner with superior low-temperature fixability. This is probably because a large contact area between the dispersed wax and resin near the surface of the toner particle enables the wax and the resin to be compatible with each other at the time of fixing and enables the resin near the surface of the toner particle to melt easily with a small heat quantity. It is also presumed that the entire toner particle can melt easily and rapidly as the resin near the surface of the toner particle melts with a small heat quantity. This can lower the fixing temperature in an electrophotographic image-forming apparatus with a high process speed and is therefore an advantageous characteristic.

In a toner particle containing wax dispersed near its surface, however, it is presumed that inorganic fine particle on the surface of the toner particle may be easily embedded in the toner particle. This is probably particularly remarkable in a high-temperature and high-humidity environment. It is presumed that inorganic fine particle embedded in the toner particle impair the flowability of the toner particles, reduce friction between the toner particle and a developing member in an image-forming apparatus, and prevent the toner particle from being sufficiently charged. Insufficiently charged toner partly present on the developing member probably tends to cause a lack in image in an electrophotographic image.

The reason for a lack in image in a high-temperature and high-humidity environment in a toner according to Japanese Patent Laid-Open Nos. 2016-62041 and 2016-224248 may be that many coarse wax domains are present near the surface of the toner particle and that inorganic fine particle on the surface of the toner particle tend to be embedded in the toner particle. Although small domains are probably less likely to reduce elasticity near the surface of the toner particle, coarse wax domains are likely to reduce elasticity near the surface of the toner particle.

As a result of repeated investigations based on the above consideration, it has been found that toner is less likely to cause a lack in image when the toner contains small domains in the following ratio near the surface of a toner particle and when the ratio of the small domains to the whole wax domains is controlled in the following ratio.

The ratio of small wax domains: a percentage ratio (R1(%)) of sum of areas of the small domains present in a first region ranging from a surface of the toner particle to a depth of 600 nm (that is, near the surface of the toner particle), with respect to the area of the first region ranges from 2.0% to 15.0%.

The ratio of small wax domains to the whole wax domains: R1(%)/R2(%) is 0.60 or more, wherein R2(%) is defined as a percentage ratio of sum of areas of all the domains present in the first region with respect to the area of the first region.

<Postulated Mechanism Offering Advantages of Present Disclosure>

A postulated mechanism by which a toner with a structure as described above has advantages of the present disclosure is described below with reference to FIG. 1.

FIG. 1 is a schematic cross-sectional view of a toner particle according to the present disclosure.

In a region (a region near the surface) between a contour 2 and a contour 3, which is 600 nm inside from the contour 2, on the surface of the toner particle, small wax domains 1 have a specific area percentage, and the ratio of the area of coarse wax domain 5 to the area of the small wax domains 1 is a specific value or less. In a toner with such a structure, the small wax domains 1 are easily dispersed in a region near the surface of the toner particle, and resin near the surface of the toner particle melts easily at the time of fixing. Thus, the toner tends to have superior low-temperature fixability. Furthermore, the amount of the coarse wax domain 5 is not excessive in the region near the surface, and inorganic fine particle 6 are less likely to be embedded in the toner particle in a high-temperature and high-humidity environment. Thus, the flowability of the toner is rarely reduced. Consequently, the toner particle is easily and sufficiently charged on a developing member, and a fixed image is less likely to have a lack in image.

<Wax>

<Percentage Ratio of Sum of Areas of Wax Domains Near Surface of Toner Particle>

In the cross section of the toner particle, when a percentage ratio of sum of areas of the domains having a major diameter of 10 to 120 nm present in the first region with respect to the area of the first region is defined as R1, R1 satisfies the following formula (1). The present inventors assume that wax domains having a major diameter of less than 10 nm are too small to be compatible with resin near the surface of the toner particle and are less likely to contribute to the improvement of the low-temperature fixability of the toner.

$$2.0 \leq R1(\%) \leq 15.0 \qquad \text{formula (1)}$$

When R1 is 2.0% or more, the toner tends to have superior low-temperature fixability. Thus, R1 is 2.0% or more, preferably 3.0% or more, more preferably 6.0% or more. When R1 is 15.0% or less, a resin component near the surface of the toner particle is less likely to melt excessively. Thus, the toner tends to have superior high-temperature storage stability. Thus, R1 is 15.0% or less, preferably 12.0% or less, more preferably 10.0% or less, still more preferably 9.0 or less.

In the cross section, when a percentage ratio of sum of areas of all the domains present in the first region with respect to an area of the first region is defined as R2, R1 and R2 satisfy the following formula (2).

$$R1(\%)/R2(\%) \geq 0.60 \qquad \text{formula (2)}$$

When the formula (1) is satisfied and when R1(%)/R2(%) is 0.60 or more, the amount of coarse wax domain is sufficiently smaller than the amount of small wax domain in the region near the surface of the toner particle, and inorganic fine particle is less likely to be embedded in the toner particle. Thus, R1(%)/R2(%) is 0.60 or more, preferably 0.80 or more. R1(%)/R2(%) may have any upper limit but is preferably 0.97 or less.

R2 is preferably 25.0% or less. When R2 is 25.0% or less, the amount of wax near the surface of the toner particle is less likely to be excessive, and inorganic fine particle is less likely to be embedded in the toner particle. Thus, R2 is 25.0% or less, preferably 20.0% or less, more preferably 15.0% or less, still more preferably 10.0% or less. R2 may have any lower limit but is preferably 2.0% or more, more preferably 3.0% or more, still more preferably 5.0% or more, still more preferably 7.0% or more.

The percentage ratio of sum of areas of wax domains in the first region refers to the ratio of the area of the wax domains to the area of the region up to 600 nm inside from the surface of the toner particle.

<Number Average of Major Diameters of Wax Domains Near Surface of Toner Particle>

Preferably, a standard deviation of major diameters of all the domains in the first region is 40 nm or less. When the standard deviation is 40 nm or less, the sizes of the wax domains near the surface of the toner particle have smaller variations, and the low-temperature fixability and flowability of the toner have smaller variations. Thus, the standard deviation is preferably 40 nm or less, more preferably 30 nm or less. The lower limit is preferably, but not limited to, 10 nm or more.

The number average A1 (nm) of the major diameters of all the wax domains in the first region preferably ranges from 50 to 200 nm. When A1 is 50 nm or more, the sizes of the wax domains near the surface of the toner particle are less likely to be excessively small, and the toner tends to have superior low-temperature fixability. Thus, A1 is preferably 50 nm or more, more preferably 75 nm or more. When A1 is 200 nm or less, the sizes of the wax domains near the surface of the toner particle are less likely to be excessively large, and the toner tends to have superior low-temperature fixability and is less likely to cause a lack in image. Thus, A1 is preferably 200 nm or less, more preferably 150 nm or less, still more preferably 100 nm or less, still more preferably 85 nm or less.

R1, R2, the standard deviation, and A1 can be controlled by the production conditions of toner particles in the production of toner (particularly cooling and annealing steps), the conditions in an external addition step, the type of wax, and the amount of wax to be added. In order for R1, R2, the standard deviation, and A1 to satisfy the preferred values, the step of microcrystallization of wax in the toner particle and the step of microcrystallization of wax near the surface of the toner particle may be further needed.

The step of microcrystallization of wax in the toner particle may be the step of rapidly cooling and then annealing the toner particle, as described later. This is because the rapid cooling of the toner particle facilitates the formation of crystal nuclei of wax contained in the toner particle, and the subsequent annealing promotes the crystal growth of the crystal nuclei and facilitates the formation of small wax domains in the toner particle.

The step of microcrystallization of wax near the surface of the toner particle may be the step of external addition of inorganic fine particle to the toner particle at a temperature at which the wax crystallizes easily. The external addition of inorganic fine particle to the toner particle at that temperature probably facilitates the formation of a large number of crystal nuclei of uncrystallized wax near the surface of the toner particle due to the impact from the inorganic fine particle. This facilitates the formation of small wax domains near the surface of the toner particle.

A1 (nm) and A2 (nm) can satisfy the following formula (3), wherein A2 (nm) is the number average of the major diameters of all wax domains in a second region ranging from a depth of 600 nm from the surface of the toner particle to a depth of 1500 nm from the surface of the toner particle.

$$A2-A1 \geq 30 \quad \text{formula (3)}$$

When A2−A1 is 30 or more, as the toner particle melts near its surface, relatively large wax domains in a region on the central side of the toner particle are likely to bleed at the time of fixing. Thus, the toner tends to have superior low-temperature fixability and releasability. Thus, A2−A1 is preferably 30 or more, more preferably 40 or more. The upper limit is preferably, but not limited to, 70 or less.

A2 preferably ranges from 110 to 210 nm. When A2 is 110 nm or more, the size of wax in a region slightly closer to the center of the toner particle than near the surface of the toner particle is less likely to be excessively small, and the toner tends to have superior releasability. Thus, A2 is preferably 110 nm or more, more preferably 125 nm or more. When A2 is 210 nm or less, inorganic fine particle is less likely to be embedded in the toner particle, and the toner is less likely to cause a lack in image. Thus, A2 is preferably 210 nm or less, more preferably 160 nm or less, still more preferably 140 nm or less.

A1, A2, and A3 can satisfy the following formula (4), wherein A3 (nm) is a number average of the major diameters of all wax domains in a third region, the third region being from a depth of 1500 nm or deeper from the surface of the toner particle.

$$A1<A2<A3 \quad \text{formula (4)}$$

When A1, A2, and A3 satisfy the formula (4), the size of a wax domain tends to decrease from the center to the surface of the toner particle, inorganic fine particle is less likely to be embedded in the toner particle, and the toner tends to have superior releasability.

A3 (nm) can satisfy the following formula (5).

$$800 \leq A3 \text{ (nm)} \quad \text{formula (5)}$$

When A3 is 800 nm or more, the toner particle can easily contain a sufficient amount of wax on the central side thereof. Consequently, as the toner particle melts near its surface at the time of fixing, the entire toner particle melts easily and rapidly, and the wax bleeds easily on the toner surface. Thus, the toner tends to have superior low-temperature fixability and releasability. Thus, A3 is preferably 800 nm or more, more preferably 1000 nm or more. The upper limit is 3000 nm or less.

A2 and A3 can be controlled by the type of wax and the amount of wax to be added in the production of toner.

<Type of Wax>

The toner particle can contain an ester wax. The ester wax is considered to be easily compatible with a resin component and therefore easily melts the resin component at the time of fixing. Thus, the toner tends to have superior low-temperature fixability.

The ratio of the mass of the ester wax to the mass of the resin component in the toner particle preferably ranges from 10.0% to 20.0% by mass because the toner tends to have superior low-temperature fixability.

The toner particle may contain any ester wax, for example, the following ester wax.

Monofunctional ester waxes, such as behenyl stearate, behenyl behenate, and stearyl behenate; bifunctional ester waxes, such as ethylene glycol distearate, dibehenyl sebacate, and hexanediol dibehenate; trifunctional ester waxes, such as glycerol tribehenate; tetrafunctional ester waxes, such as pentaerythritol tetrastearate and pentaerythritol tetrapalmitate; hexafunctional ester waxes, such as dipentaerythritol hexastearate and dipentaerythritol hexapalmitate; polyfunctional ester waxes, such as polyglycerin behenate; and natural ester waxes, such as carnauba wax and rice wax.

The toner particle can contain the ester wax and a hydrocarbon wax. The hydrocarbon wax in addition to the ester wax in the toner particle can easily form small wax domains near the surface of the toner particle. This is probably because the hydrocarbon wax has a high crystallization speed and is easily microcrystallized together with the ester wax near the toner particle.

The ratio of the mass of the hydrocarbon wax to the mass of the resin component in the toner particle preferably ranges from 5.0% to 15.0% by mass because the toner is less likely to cause a lack in image.

The toner may contain any hydrocarbon wax, for example, the following hydrocarbon wax.

Fischer-Tropsch hydrocarbon waxes and derivatives thereof; petroleum waxes and derivatives thereof, such as paraffin wax, microcrystalline wax, and petrolatum; polyolefin waxes and derivatives thereof, such as polyethylene wax and polypropylene wax; higher aliphatic alcohols; and long-chain fatty acids.

<Crystallization Peak Temperature>

The wax preferably has a crystallization peak temperature in the range of 60° C. to 80° C. When the crystallization peak temperature is within this range, it is presumed that the wax is easily microcrystallized in the toner particle. Consequently, the toner particle can satisfy the formulae (1) and (2). A crystallization peak is measured as described later. The crystallization peak of the wax can be controlled by the type of wax contained in the toner.

<Wax Content>

The ratio of the mass of the wax to the mass of the resin component contained in the toner particle preferably ranges from 10.0% to 35.0% by mass. The wax contained in the toner particle at this ratio can eliminate a lack in image, and the toner tends to have superior low-temperature fixability and releasability. More preferably, the ratio ranges from 20.0% to 35.0% by mass.

<Inorganic Fine Particle>

<Dispersity of Inorganic Fine Particle>

The inorganic fine particle on the surface of the toner particle preferably have a dispersity of 2.0 nm or less. The dispersity is calculated using the following formula.

$$\text{Dispersity} = \sqrt{\frac{\sum_{i}^{n}(dn\ \min - \text{dave})^2}{n}}\ /\text{dave}$$

(n: the number of inorganic fine particle, dn min: the distance between an inorganic fine particle and the nearest inorganic fine particle, dave: the average distance between an inorganic fine particle and the nearest inorganic fine particle in one toner particle)

A smaller dispersity means a shorter distance between inorganic fine particle on the surface of the toner particle. When the dispersity is 2.0 or less, the inorganic fine particle tend to be uniformly dispersed on the surface of the toner particle. Consequently, the inorganic fine particle on the surface of the toner particle can reduce the friction between toner particles, and the flowability of the toner is rarely reduced. Thus, a lack in image is less likely to occur in the fixed image.

The dispersity of the inorganic fine particle on the toner surface can be controlled by the conditions in the external addition step, the type of inorganic fine particle, and the amount of inorganic fine particle to be added.

<Inorganic Fine Particle (X)>

The inorganic fine particle preferably contain inorganic fine particle (X) having a primary particle major diameter of 60 to 300 nm. The inorganic fine particle (X) may be fine silica, titanium oxide, alumina, or strontium titanate particles. The inorganic fine particle (X) can be fine silica particles in terms of uniform charging and improved flowability of the toner. The fine silica particles may be wet silica produced by a precipitation method or a sol-gel method or dry silica produced by a deflagration method or a fumed method. Fine wet silica particles produced by the sol-gel method can be used in terms of dispersibility on the surface of the toner particle.

<Relationship Between Coverage X (%) with Inorganic Fine Particle (X) and Amount of Wax Near Surface of Toner Particle>

The coverage X (%) with the inorganic fine particle (X) and R2(%) can satisfy the following formula (6).

$$X \le R2 \qquad \text{formula (6)}$$

When the relationship between the coverage X and the percentage ratio of sum of areas R2 of all the domains near the surface of the toner particle satisfies the formula (6), the toner tends to have superior low-temperature fixability.

The coverage X preferably ranges from 1.0 to 8.0. A coverage X of 1.0 or more tends to result the toner with improved flowability and without a lack in a fixed image. Thus, the coverage X is preferably 1 or more, more preferably 2.0 or more, still more preferably 4.0 or more. A coverage X of 8.0 or less rarely results in an excessive number of inorganic fine particle on the surface of the toner particle. Thus, the coverage X is preferably 8.0 or less, more preferably 6.0 or less.

The coverage X with the inorganic fine particle (X) can be controlled by the production conditions in the external addition step, the type of inorganic fine particle, and the amount of inorganic fine particle to be added.

<Inorganic Fine Particle (Y)>

To improve the flowability and chargeability of the toner, the inorganic fine particle can contain inorganic fine particle (Y) having a primary particle major diameter of 5 to 30 nm.

The inorganic fine particle (Y) may be a fluoropolymer powder, such as a fine vinylidene fluoride powder or a fine polytetrafluoroethylene powder; fine silica particles, such as wet-process silica or dry-process silica, or treated silica produced by surface-treating the fine silica particles with a silane compound, a titanium coupling agent, or silicone oil; fine titanium oxide or fine alumina; an oxide, such as zinc oxide or tin oxide; a double oxide, such as strontium titanate, barium titanate, calcium titanate, strontium zirconate, or calcium zirconate; or a carbonate compound, such as calcium carbonate or magnesium carbonate.

The inorganic fine particle (Y) can be fine dry silica particles. The fine dry silica particles can be subjected to hydrophobic treatment. Examples of the fine dry silica particles are described below.

AEROSIL (Nippon Aerosil Co., Ltd.) 130, 200, 300, 380, TT600, MOX170, MOX80, and COK84, Ca-O-SiL (CABOT Co.) M-5, MS-7, MS-75, HS-5, and EH-5, Wacker HDK N 20 (WACKER-CHEMIE GMBH) V15, N20E, T30, and T40, D-C Fine Silica (Dow Corning Corporation), and Fransol (Fransil).

<Resin Component>

The resin component can be a binder resin. More specifically, the toner particle can contain a binder resin and a wax.

The resin component may contain any resin, including the following resins.

Homopolymers of styrene and its substitution products, such as polystyrene and polyvinyltoluene; styrene copolymers, such as styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-dimethylaminoethyl acrylate copolymers, styrene-methyl methacrylate copolymers, styrene-ethyl methacrylate copolymers, styrene-butyl methacrylate copolymers, styrene-dimethylaminoethyl methacrylate copolymers, styrene-vinyl methyl ether copolymers, styrene-vinyl ethyl ether copolymers, styrene-vinyl methyl ketone copolymers, styrene-butadiene copolymers, styrene-isoprene copolymers, styrene-maleic acid copolymers, and styrene-maleate copolymers; and poly(methyl methacrylate), poly(butyl methacrylate), poly(vinyl acetate), polyethylene, polypropylene, poly(vinyl butyral), silicone resins, polyesters, polyamide resins, epoxy resins, and polyacrylic resins. These may be used alone or in combination. Among these, styrene acrylic resins, such as styrene-butyl acrylate copolymers, can be used in terms of development characteristics and fixability. A content of the styrene acrylic resin with respect to a content of the resin component preferably ranges from 80.0% to 100.0% by mass.

<Styrene Acrylic Resins>

Examples of polymerizable monomers corresponding to monomer units constituting the styrene acrylic resins include the following.

Styrenic polymerizable monomers, such as styrene, α-methylstyrene, o-methylstyrene, m-methylstyrene, p-methylstyrene, p-methoxystyrene, and p-ethylstyrene.

Acrylic polymerizable monomers, such as methyl acrylate, ethyl acrylate, n-propyl acrylate, iso-propyl acrylate, n-butyl acrylate, iso-butyl acrylate, tert-butyl acrylate, n-hexyl acrylate, 2-ethylhexyl acrylate, n-octyl acrylate, dodecyl acrylate, stearyl acrylate, 2-chloroethyl acrylate, cyclohexyl acrylate, and phenyl acrylate.

Methacrylic polymerizable monomers, such as methyl methacrylate, ethyl methacrylate, n-propyl methacrylate, iso-propyl methacrylate, n-butyl methacrylate, iso-butyl methacrylate, tert-butyl methacrylate, n-hexyl methacrylate, dodecyl methacrylate, 2-ethylhexyl methacrylate, stearyl methacrylate, n-octyl methacrylate, phenyl methacrylate, dimethylaminoethyl methacrylate, and diethylaminoethyl methacrylate.

Other monomers, such as acrylonitrile, methacrylonitrile, and acrylamide.

The styrene acrylic resins may be produced by any method. The resin component may be a combination of resins other than the styrene acrylic resins.

<Amorphous Polyester>

The resin component may contain an amorphous polyester. The amorphous polyester may be appropriately selected from a saturated polyester, an unsaturated polyester, and both. The amorphous polyester content of the resin component preferably ranges from 0.1% to 10.0% by mass, more preferably 0.1% to 5.0% by mass.

The amorphous polyester is a resin composed of an alcohol component and a carboxylic acid component. Examples of these components include the following.

Examples of the alcohol component include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, cyclohexanedimethanol, butenediol, octenediol, cyclohexenedimethanol, hydrogenated bisphenol A, bisphenol and derivatives thereof represented by the following formula (A), and diols represented by the following formula (B).

A

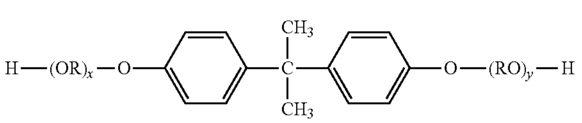

(In the formula (A), R denotes ($-CH_2-CH_2-$) or ($-CH_2-CH_2-CH_2-$). x and y are independently an integer of 0 or more, and the average of x+y ranges from 0 to 10.)

(B)

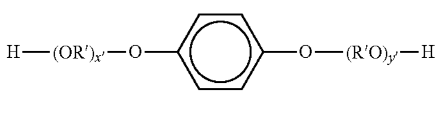

-continued (B1)

$-CH_2CH_2-$ (B2)

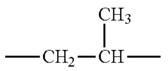

(B3)

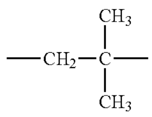

(In the formula (B), R' denotes any one of (B1) to (B3). x' and y' are independently an integer of 0 or more, and the average of x'+y' ranges from 0 to 10.)

The alcohol component of the amorphous polyester can be a bisphenol or a derivative thereof represented by the formula (A). The average of x+y in the formula (A) preferably ranges from 1 to 4. R in the formula (A) can be ($-CH_2-CH_2-$).

Examples of the carboxylic acid component include benzene dicarboxylic acids, such as phthalic acid, terephthalic acid, isophthalic acid, and phthalic anhydride; alkyl dicarboxylic acids, such as succinic acid, adipic acid, sebacic acid, and azelaic acid; alkenyl succinic acids and alkyl succinic acids, such as n-dodecenyl succinic acid and n-dodecyl succinic acid; unsaturated dicarboxylic acids, such as fumaric acid, maleic acid, citraconic acid, and itaconic acid; and acid anhydrides and lower alkyl esters of these carboxylic acids.

The carboxylic acid component of the amorphous polyester can be a benzene dicarboxylic acid, such as terephthalic acid or isophthalic acid, and can be terephthalic acid.

<Physical Properties of Toner>

<Glass Transition Temperature of Toner>

The toner preferably has a glass transition temperature in the range of 45° C. to 55° C. because the toner tends to have superior low-temperature fixability.

<Weight-Average Particle Diameter (D4) of Toner>

The toner preferably has a weight-average particle diameter (D4) in the range of 5.0 to 10.0 μm. The toner with a weight-average particle diameter (D4) in this range tends to have appropriate charging stability, fixability, and developability. More preferably, the toner has a D4 in the range of 5.0 to 9.0 μm.

The weight-average particle diameter (D4) of the toner can be controlled by pulverization conditions when the toner is produced by a pulverization method. The weight-average particle diameter (D4) of the toner can be controlled by the amount of dispersion stabilizer or the rotation speed of an agitator when the toner is produced in an aqueous medium.

Likewise, the toner particles preferably have a weight-average particle diameter (D4) in the range of 5.0 to 10.0 μm.

The toner particles preferably have a particle size in the range of 4.0 to 9.0 μm.

<Various Additive Agents>

If necessary, the toner may contain one or more additive agents selected from a colorant, a magnetic material, a charge control agent, and a fluidizer. Various additive agents for use in the toner are specifically described below.

<Colorant>

Examples of the colorant include the following.

Black colorants, such as carbon black, magnetic materials, and colorants produced by toning to black using yellow, magenta, and cyan colorants described below.

Examples of the yellow colorant include monoazo compounds, disazo compounds, condensed azo compounds, isoindolinone compounds, anthraquinone compounds, azo metal complexes, methine compounds, and allylamide compounds.

Examples of the magenta colorant include monoazo compounds, condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Examples of the cyan colorant include copper phthalocyanine compounds and derivatives thereof, anthraquinone compounds, and basic dye lake compounds.

<Magnetic Material>

The magnetic material is composed mainly of magnetic iron oxide, such as triiron tetroxide or γ-iron oxide, and may contain phosphorus, cobalt, nickel, copper, magnesium, manganese, aluminum, and/or silicon. The shape of the magnetic material may be polyhedral, octahedral, hexahedral, spherical, spicular, or flaky. To increase image density, the shape of the magnetic material can be less anisotropic, such as polyhedral, octahedral, hexahedral, or spherical.

<Charge Control Agent>

Examples of the charge control agent that can be negatively charged include the following.

Monoazo metal compounds, acetylacetone metal compounds, aromatic oxycarboxylic acids, aromatic dicarboxylic acids, oxycarboxylic acids and dicarboxylic acid metal compounds, aromatic oxycarboxylic acids, aromatic mono and polycarboxylic acids and their metal salts, anhydrides, and esters, phenol derivatives, such as bisphenol, urea derivatives, metal-containing salicylic acid compounds, metal-containing naphthoic acid compounds, boron compounds, quaternary ammonium salts, calixarene, and resin-based charge control agents.

Examples of the charge control agent that can be positively charged include the following.

nigrosine and nigrosine modified with fatty acid metal salts; guanidine compounds; imidazole compounds; onium salts, for example, quaternary ammonium salts, such as tributylbenzylammonium-1-hydroxy-4-naphthosulfonate and tetrabutylammonium tetrafluoroborate, and their analogs, such as phosphonium salts, and lake pigments thereof; triphenylmethane dyes and lake pigments thereof (examples of laking agents include phosphotungstic acid, phosphomolybdic acid, phosphotungstenmolybdic acid, tannic acid, lauric acid, gallic acid, ferricyanide, and ferrocyanide); higher fatty acid metal salts; diorganotin oxides, such as dibutyltin oxide, dioctyltin oxide, and dicyclohexyltin oxide; diorganotin borates, such as dibutyltin borate, dioctyltin borate, and dicyclohexyltin borate; and resin-based charge control agents.

These may be used alone or in combination.

Among these, metal-containing salicylic acid compounds can be used, and the metal can be aluminum or zirconium. In particular, an aluminum salicylate compound can be used.

The resin-based charge control agents can be polymers and copolymers with a sulfonic acid group, a sulfonic acid salt group or a sulfonic ester group, a salicylic acid moiety, or a benzoic acid moiety.

The charge control agent content preferably ranges from 0.01 to 20.0 parts by mass, more preferably 0.05 to 10.0 parts by mass, per 100.0 parts by mass of the resin component.

<Method for Producing Toner>

The toner may be produced by any method, including a pulverization method, a suspension polymerization method, an emulsion aggregation method, or a dissolution suspension method. The suspension polymerization method can easily control the state of wax in the toner particle.

A cooling step and an annealing step in a method for producing a toner according to the present disclosure are described below.

In the cooling step, a dispersion liquid of toner particles subjected to a volatile component removing step can be cooled from the cooling start temperature to the cooling end temperature before transferred to the next step. The formability of crystal nuclei of wax domains in the toner particle can be controlled by the conditions in the cooling step. The cooling conditions are changed by changing the cooling start temperature, the cooling rate, and the cooling end temperature.

The method for producing a toner can include a holding step of holding a dispersion liquid of toner particles in the temperature range of Ta+15 (° C.) to Ta+35 (° C.), wherein Ta is the crystallization peak temperature of the wax. The step of holding toner particles in that temperature range probably improves the flowability of the wax in the toner particle and facilitates the dispersion of the wax in the toner particle.

The method for producing a toner can also include a cooling step of cooling the dispersion liquid subjected to the holding step at a cooling rate in the range of 40.0° C./min to 200.0° C./min from the cooling start temperature to the cooling end temperature.

A cooling rate in this range results in sufficiently fast crystallization of the wax while cooling, thereby facilitating the formation of crystal nuclei of wax domains in the toner particle. The cooling rate preferably ranges from 100.0° C./min to 140.0° C./min.

The cooling start temperature is preferably in the temperature range of Ta+15 (° C.) to Ta+35 (° C.), and the cooling end temperature is preferably in the temperature range of Ta−35 (° C.) to Ta−20 (° C.).

A cooling start temperature in this range can result in easy melting of the wax in the toner particle and easy dispersion of the wax in the toner particle.

A cooling end temperature in this range can result in rapid crystallization of the wax in the toner particle, thereby facilitating the formation of a large number of crystal nuclei of the wax in the toner particle. The formation of a large number of crystal nuclei tends to prevent the crystal growth and aggregation of wax domains and facilitates the formation of small wax domains.

The dispersion liquid subjected to the cooling step is subjected to the annealing step to promote crystallization of the wax. The annealing step probably facilitates the microcrystallization of the wax around the crystal nuclei formed in the cooling step.

The conditions in the annealing step can be determined by the annealing temperature and the annealing time. Regarding the annealing temperature and the annealing time, the dispersion liquid is preferably held in the temperature range of Ta−35 (° C.) to Ta−20 (° C.) for 30 minutes or more. The time of the annealing step is preferably 150 minutes or less.

After the toner particles are removed from the dispersion liquid subjected to the annealing step, an external addition step of mixing the toner particles and inorganic fine particle in the temperature range of Ta−35 (° C.) to Ta−20 (° C.) can be performed. The external addition of inorganic fine particles to the toner particles in the temperature range probably facilitates the formation of a large number of crystal nuclei of uncrystallized wax near the surface of the toner particles due to the impact from the inorganic fine particles. This probably facilitates the formation of small wax domains near the surface of the toner particles.

In the toner produced through this production process, R1 and A1 easily satisfy the preferred ranges.

Thus, the method for producing a toner can include (i) forming particles containing a polymerizable monomer and a wax in an aqueous medium;

(ii) polymerizing the polymerizable monomer in the particles to form toner particles;

(iii) holding a dispersion liquid in which the toner particles are dispersed in a temperature range of Ta+15 (° C.) to Ta+35 (° C.), wherein Ta (° C.) is a crystallization peak temperature of the wax, and then cooling the dispersion liquid from a temperature in the range of Ta+15 (° C.) to Ta+35 (° C.) to a temperature in a range of Ta−35 (° C.) to Ta−20 (° C.), with a cooling rate of 40.0° C./min to 200.0° C./min;

(iv) annealing the dispersion liquid obtained in the step (iii) by holding the dispersion liquid in the temperature range of Ta−35 (° C.) to Ta−20 (° C.) for 30 minutes or more;

(v) removing the toner particles from the dispersion liquid resulting from the step (iv); and (vi) externally adding inorganic fine particles to the toner particles in the temperature range of Ta−35 (° C.) to Ta−20 (° C.)

For a toner particle containing a plurality of types of wax, Ta refers to the crystallization peak temperature of the wax with the highest content in the toner particle.

<Various Measurement Methods>

Various measurement methods are described below.

<Method for Measuring a Percentage Ratio of Sum of Areas of Wax Domain in Specific Region of Cross Section of Toner Particle>

(1) Observation of Cross Section of Toner by STEM

To observe a crystalline material, such as wax, in toner, a section of the toner is prepared, is stained with ruthenium tetroxide, and is observed with a STEM. Staining with ruthenium tetroxide makes a contrast difference between an amorphous resin, such as a binder resin, and a crystalline material, such as wax, in STEM observation. This enables the crystalline material, such as wax, to be easily distinguished in the observation.

First, a toner is dispersed in a visible light curable resin (trade name: Aronix LCR series D-800, manufactured by Toagosei Co., Ltd.) and is cured by irradiation with short-wavelength light. The cured product is cut with an ultramicrotome equipped with a diamond knife to prepare a 250-nm flaky sample.

The sample is then magnified with a transmission electron microscope (trade name: electron microscope JEM-2800, manufactured by JEOL Ltd.) (TEM-EDX) in the magnification range of 40,000 to 50,000 to acquire a cross-sectional image of a toner particle.

The toner to be observed is selected as described below.

First, the cross-sectional area of a toner particle is determined from an image of a cross section of the toner particle, and the diameter of a circle with an area equal to the cross-sectional area (circle-equivalent diameter) is determined. Only an image of a cross section of a toner particle with the absolute difference between the circle-equivalent diameter and the weight-average particle diameter (D4) of the toner being 1.0 μm or less is observed.

(2) Binarization Using Image Analysis Software

Wax domains in a TEM image are binarized using image analysis software. In the present disclosure, binarization was performed using image analysis software ImageJ. The binarization conditions are appropriately selected in accordance with the observation conditions and the like. The ImageJ is image analysis software available from "https://imagej.nih.gov/ij/".

As an example of the measurement of the percentage ratio of sum of areas of wax domains in a specific region in the observation in a cross section of a toner particle, the measurement of the percentage ratio of sum of areas of wax domains in the first region is described below.

Reopen a TEM image before binarization using the ImageJ, select [Process]-[Find Edge], and extract the contour of toner. Select [centroid] from [Analyze]-[Set Measurements], then select [Analyze]-[Analyze Particles] to determine the position of the center of gravity of the toner, and determine a length from the position of the center of gravity to the contour of the toner. Select [Image]-[Scale] such that the length to the contour is shortened by 600 nm, and scale down the image. Superimpose the scaled-down image on the image in which wax domains are initially binarized, and mask a region 600 nm or more from the surface of the toner particle.

(3) A Method for Measuring the Percentage Ratio of Sum of Areas (R1) of the Small Domains Having a Major Diameter of 10 to 120 nm and the Percentage Ratio of Sum of Areas R2 of all Wax Domains in the First Region.

In the ImageJ, after the binarization operation, select [Feret's Diameter] and [Area] from [Analyze]-[Set Measurements], select [Analyze]-[Analyze Particles], determine the area and the major diameter of wax domains, and calculate the total area of domains having a major diameter of 10 nm or more and 120 nm or less. The entire region up to 600 nm inside from the toner surface is ready for binarization using the toner contour extracted images before and after the scaling down. Select [Analyze]-[Analyze Particles] to determine the area of the first region ranging from a surface of the toner particle to a depth of 600 nm from the surface of the toner particle, and determine the percentage ratio of sum of areas of wax domains having a major diameter of 10 nm or more and 120 nm or less and the percentage ratio of sum of areas of all wax domains.

The above operation is performed on STEM cross-sectional images of ten toner particles. The average of the percentage ratio of sum of areas of wax domains having a major diameter of 10 nm or more and 120 nm or less is referred to as R1, and the average of the percentage ratio of sum of areas of all wax domains is referred to as R2. The number average A1 of the major diameters of wax domains and the standard deviation of the major diameters of all the domains in the first region can be calculated from the major diameters determined as described above. The number average A1, and the standard deviation of the major diameters of all the domains present in the first region, are the average results calculated from the STEM cross-sectional images of ten toner particles.

A2 and A3 in the present disclosure can also be calculated in the same manner as the above operation.

For wax domains 4 in FIG. 1 crossing the contour 3, which is 600 nm inside from the contour 2 toward the center of gravity in the cross section of the toner particle, the calculation is performed on the assumption that the wax domains belong to a region with the largest occupied area.

<Method for Measuring Weight-Average Particle Diameter (D4) of Toner and Toner Particles>

The weight-average particle diameter (D4) of toner is measured as described below.

The measuring apparatus is a precision particle size distribution analyzer "Coulter Counter Multisizer 3" (registered trademark, manufactured by Beckman Coulter, Inc.) equipped with a 100-μm aperture tube utilizing an aperture impedance method. Accessory dedicated software "Beckman Coulter, Multisizer 3 Version 3.51" (manufactured by Beckman Coulter, Inc.) is used to set the measurement conditions and analyze measured data. The effective measuring channel number is 25,000.

An aqueous electrolyte used in the measurement may be 1% by mass special grade sodium chloride dissolved in deionized water, for example, "ISOTON II" (manufactured by Beckman Coulter, Inc.).

Before the measurement and analysis, the dedicated software is set up as described below.

On the "Standard operation mode (SOM) setting" screen of the dedicated software, the total count number in control mode is set at 50,000 particles, the number of measurements is set at 1, and the Kd value is set at a value obtained with "standard particles 10.0 μm" (manufactured by Beckman Coulter, Inc.). A "Threshold/noise level measurement button" is pushed to automatically set the threshold and noise level. The current is set at 1600 μA. The gain is set at 2. ISOTON II is chosen as an electrolyte solution. "Flushing of aperture tube after measurement" is checked.

On the "Conversion of pulse into particle diameter" setting screen of the dedicated software, the bin interval is set to the logarithmic particle diameter, the particle diameter bin is set to a 256 particle diameter bin, and the particle diameter range is set at 2 to 60 μm.

The specific measurement method is described below.

(1) A 250-mL round-bottom glass beaker for Multisizer 3 is charged with 200 mL of aqueous electrolyte and is placed on a sample stand. A stirrer rod is rotated counterclockwise at 24 revolutions per second. Soiling and air bubbles in the aperture tube are removed using the "Aperture tube flushing" function of the dedicated software.

(2) A 100-mL flat-bottom glass beaker is charged with 30 mL of aqueous electrolyte. To the aqueous electrolyte is added 0.3 mL of a dispersant "Contaminon N" (a 10% by mass aqueous neutral detergent for cleaning precision measuring instruments composed of a nonionic surface-active agent, an anionic surface-active agent, and an organic builder, pH 7, manufactured by Wako Pure Chemical Industries, Ltd.) diluted 3-fold by mass with deionized water.

(3) An ultrasonic disperser "Ultrasonic Dispersion System Tetora 150" (manufactured by Nikkaki-Bios Co., Ltd.) is prepared. The ultrasonic disperser includes two oscillators having an oscillation frequency of 50 kHz and has an electrical output of 120 W. The two oscillators have a phase difference of 180 degrees. A water tank of the ultrasonic disperser is charged with 3.3 L of deionized water, and 2 mL of Contaminon N is added to the deionized water.

(4) The beaker in (2) is placed in a beaker-holding hole in the ultrasonic disperser, and the ultrasonic disperser is actuated. The vertical position of the beaker is adjusted such that the surface resonance of the aqueous electrolyte in the beaker is highest.

(5) While the aqueous electrolyte in the beaker in (4) is exposed to ultrasonic waves, 10 mg of toner particles are added little by little to the aqueous electrolyte and are dispersed. The ultrasonic dispersion treatment is continued for another 60 seconds. During the ultrasonic dispersion, the water temperature of the water tank is controlled at a temperature of 10° C. or more and 40° C. or less.

(6) The aqueous electrolyte containing dispersed toner particles prepared in (5) is added dropwise with a pipette into the round-bottom beaker prepared in (1) placed on the sample stand such that the measurement concentration is 5%. Measurement is continued until the number of measured particles reaches 50,000.

(7) The measured data are analyzed using the accessory dedicated software to determine the weight-average particle diameter (D4). The "Average diameter" on the "Analysis/volume statistics (arithmetic mean)" screen in the setting of graph/volume percent in the dedicated software is the weight-average particle diameter (D4) of the toner.

The weight-average particle diameter (D4) of the toner particles is also determined in the same manner.

<Dispersity of Inorganic Fine Particle on Surface of Toner Particle>

The dispersity of inorganic fine particle on the surface of a toner particle is determined with a scanning electron microscope "S-4800 (manufactured by Hitachi High-Technologies Corporation)". Toner containing toner particles to which inorganic fine particle is externally added was observed at an accelerating voltage of 1.0 kV in a field magnified 10,000 times. In an observed image, calculation was made as described below using the image-processing software "ImageJ".

Binarization was performed such that only the inorganic fine particle were extracted. The number n of the inorganic fine particle and the barycentric coordinates of all the inorganic fine particle were calculated. The distance dn min between the inorganic fine particle and the nearest external additive was calculated. The dispersity is represented by the following formula, wherein dave denotes the average of the closest distances between the inorganic fine particle in one toner particle.

$$\text{Dispersity} = \sqrt{\frac{\sum_{l}^{n}(dn\ \text{min} - \text{dave})^2}{n}}\Big/\text{dave}$$

The dispersity of 50 toner particles randomly observed was determined by the above procedure, and the average thereof was defined as the dispersity of the inorganic fine particle on the surface of the toner particle.

<Method for Measuring Coverage X of Toner Particle Surface with Inorganic Fine Particle (X)>

The coverage X is calculated by analyzing a toner surface image photographed with the scanning electron microscope "S-4800" using the image analysis software ImageJ. Details up to the calculation are described below.

(1) Sample Preparation

An electrically conductive paste is thinly applied to a sample stage (aluminum sample stage 15 mm×6 mm) and is sprayed with toner. Excess toner is removed from the sample stage by air blowing. The electrically conductive paste is thoroughly dried. The sample stage is placed in a sample holder. The sample stage height is adjusted to 36 mm using a sample height gage.

(2) Setting of S-4800 Observation Conditions

The coverage is calculated in an image obtained in backscattered electron image observation with S-4800. The coverage is measured after particles (resin particles and the like) other than the inorganic fine particle on the toner surface are excluded by elemental analysis with an energy dispersive X-ray spectrometer (EDAX).

An anti-contamination trap attached to the housing of the S-4800 overflowing with liquid nitrogen is left for 30 minutes. Actuate "PC-SEM" of the S-4800, and perform flushing (cleaning of an electron source FE chip). Click an accelerating voltage indication of a control panel on the screen, and press a [flushing] button to open a flushing dialog. Confirm that the flushing intensity is 2, and perform flushing. Confirm that the emission current by flushing ranges from 20 to 40 μA. Insert the sample holder into a sample chamber in the S-4800 housing. Press a [Starting point] on the control panel to move the sample holder to the observation position.

Click the accelerating voltage indication to open an HV setting dialog, and set the accelerating voltage at [1.1 kV] and the emission electric current at [20 μA]. In a [Basis] tab on the operation panel, set the signal selection at [SE], select [Up (U)] and [+BSE] for an SE detector, and select [L.A.100] in a selection box on the right side of [+BSE] to adopt a backscattered electron image observation mode. In the same [Basis] tab on the operation panel, set the probe current of the electron optical system condition block at [Normal], and set the focal point mode at [UHR] and WD at [4.5 mm]. Press an [ON] button of the accelerating voltage indication on the control panel to apply the accelerating voltage.

(3) Focus Adjustment

Rotate a focus knob [COARSE] on the operation panel to adjust the focus to some extent, and adjust the aperture alignment. Click an [Align] on the control panel to display an alignment dialog, and select [Beam]. Rotate STIGMA/ALIGNMENT knobs (X, Y) on the operation panel to move an indicated beam to the center of concentric circles. Then select an [Aperture], and rotate each of the STIGMA/ALIGNMENT knobs (X, Y) to stop or minimize the movement of an image. Close the aperture dialog, and adjust the focus by autofocusing. Subsequently, set the magnification at 50,000 (50 k) times, perform focus adjustment with the focus knob and the STIGMA/ALIGNMENT knobs in the same manner as described above, and adjust the focus again by autofocusing. Repeat this operation to adjust the focus. The accuracy of measurement of the coverage tends to decrease with the increasing tilt angle of the observation surface. Thus, the observation surface is selected such that the focus can be entirely adjusted at a time in focus adjustment, and a surface with a minimum tilt is selected and analyzed.

(4) Image Storage

Adjust brightness in an ABC mode, and take and store a photograph with a size of 640×480 pixels. Use this image file to perform the following analysis. Take one photograph for each of 25 toner particles.

(5) Image Analysis

In the present disclosure, the coverage is calculated by using the following analysis software to binarize an image obtained by the above method. One screen is divided into 12 squares, which are individually analyzed. The analysis conditions of the image analysis software ImageJ are described below.

The coverage X is calculated in the square region divided in the above method. The area (C) of the region ranges from 24,000 to 26,000 pixels.

In ImageJ, select [Feret's Diameter] and [Area] from [Analyze]-[Set Measurements], select [Analyze]-[Analyze Particles], determine the total area and the primary particle major diameter of inorganic fine particle, and calculate the total area of inorganic fine particle having a primary particle major diameter of 60 nm or more and 300 nm or less. This image analysis can be performed to measure the primary particle major diameter of the inorganic fine particle.

The coverage is determined using the following formula from the area C of the square region and the sum total D of regions including the inorganic fine particle having a primary particle major diameter of 60 nm or more and 300 nm or less.

$$\text{Coverage } (\%) = D/C \times 100$$

The average of all the data is defined as the coverage X.

<Method for Measuring Glass Transition Temperature, Crystallization Peak Temperature, and Melting Point of Sample>

The glass transition temperature of a sample is measured with a differential scanning calorimeter "Q2000 (manufactured by TA Instruments)" in accordance with ASTM D3418-82.

The melting points of indium and zinc are used for the temperature correction of a detecting unit, and the heat of fusion of indium is used for calorimetric correction.

More specifically, 2 mg of a sample is accurately weighed and put into an aluminum pan. An empty aluminum pan is used as a reference.

The measurement is performed at a temperature increase rate of 10° C./min in the temperature range of −10° C. to 200° C. In the measurement, the temperature is increased from −10° C. to 200° C. at a temperature increase rate of 10° C./min and is then decreased from 200° C. to −10° C. at a temperature decrease rate of 10° C./min.

The temperature is then increased again from −10° C. to 200° C. at a temperature increase rate of 10° C./min.

The crystallization peak temperature is determined from a DSC curve in the temperature range of 200° C. to −10° C. during the first temperature decrease.

The crystallization peak temperature of the sample is the temperature with the highest peak height with respect to a baseline before and after the specific heat change in the DSC curve during the first temperature decrease.

The glass transition temperature is determined from a DSC curve in the temperature range of 20° C. to 100° C. during the second temperature increase.

The glass transition temperature of the sample is the temperature (° C.) at the intersection point of the DSC curve and the line at the midpoint of the baseline before and after the specific heat change in the DSC curve during the second temperature increase. The melting point of the sample is the temperature with the highest peak height in the DSC curve during the second temperature increase.

EXAMPLES

Although the present disclosure is further described in the following exemplary embodiments and comparative examples, the present disclosure is not limited to these exemplary embodiments. Unless otherwise specified, "part" in the exemplary embodiments is based on mass.

Production Example of Wax 1

Stearic acid 100.0 parts by mass

Behenyl alcohol 252.0 parts by mass p-Toluenesulfonic acid 0.50 parts by mass

An esterification reaction of these materials was allowed to proceed under reflux at 120° C. for 6 hours. Water produced was removed from the system as a toluene/water azeotrope. After completion of the reaction, p-toluenesulfonic acid was neutralized with sodium hydrogen carbonate. Toluene was evaporated from the resulting solution to yield a product. The product was heated to 90° C. and was filtered through Celite to remove sodium p-toluenesulfonate, thus producing a wax 1. Table 1 shows the physical properties of the wax 1.

Production Examples of Wax 2 and Wax 4

A wax 2 and a wax 4 were produced in the same manner as the production example of the wax 1 except that the type and amount of acid monomers and alcohol monomers to be used were changed as shown in Table 1. Table 1 shows the physical properties of the wax 2 and the wax 4.

Table 1 also shows the physical properties of a wax 3 and a wax 5.

TABLE 1

| | | Alcohol monomer | | Carboxylic acid monomer | | Melting point | Cold crystallization peak |
|---|---|---|---|---|---|---|---|
| | Compound name | Type | parts | Type | parts | [° C.] | temperature [° C.] |
| Wax 1 | Behenyl stearate | Behenyl alcohol | 252 | Stearic acid | 100 | 68 | 65 |
| Wax 2 | Stearyl behenate | Stearyl alcohol | 95 | Behenic acid | 120 | 69 | 64 |
| Wax 3 | Oleamide | — | — | — | — | 73 | 70 |
| Wax 4 | Ethylene glycol distearate | Ethylene glycol | 21 | Stearic acid | 100 | 76 | 71 |
| Wax 5 | Paraffin wax | — | — | — | — | 78 | 76 |

Production Example of Inorganic Fine Particle 1

589.6 parts of methanol, 42.0 parts of water, and 47.1 parts of 28% by mass aqueous ammonia were mixed in a 3-liter glass reactor equipped with a stirrer, a dropping funnel, and a thermometer. The resulting solution was adjusted to 35° C., and 1100.0 parts of tetramethoxysilane and 395.2 parts of 5.4% by mass aqueous ammonia were simultaneously added to the solution while stirring. The tetramethoxysilane was added dropwise for six hours, and the aqueous ammonia was added dropwise for five hours. After completion of the dropwise addition, the solution was stirred for another 0.5 hours for hydrolysis, thus yielding a methanol-water dispersion liquid of hydrophilic spherical sol-gel silica fine particles. The glass reactor was then provided with an ester adapter and a cooling tube, and the dispersion liquid was thoroughly dried at 80° C. under reduced pressure, thus yielding a raw material of inorganic fine particle. The above process was performed tens of times, and the raw material of inorganic fine particle was crushed with a pulverizer (manufactured by Hosokawa Micron Corporation).

Subsequently, 500 parts of the crushed raw material of inorganic fine particle was charged into a stainless steel autoclave with a polytetrafluoroethylene inner tube. After the interior of the autoclave was replaced with nitrogen gas, 0.5 parts of hexamethyldisilazane (HMDS) and 0.1 parts of water were atomized with a two-fluid nozzle and sprayed evenly on the silica powder while an impeller blade attached to the autoclave was rotated at 400 rpm. After stirring for 30 minutes, the autoclave was tightly closed and was heated at 200° C. for two hours. Subsequently, the system was deammoniated while heating under reduced pressure to produce inorganic fine particle 1. Table 2 shows the physical properties of the inorganic fine particle 1.

<Production Examples of Inorganic Fine Particle 2 to 5>

Inorganic fine particle 2 to 5 were produced in the same manner as the production example of the inorganic fine particle 1 except that the amount of methanol, the drop time of tetramethoxysilane, and the drop time of 5.4% by mass aqueous ammonia were changed as shown in Table 2. In the surface treatment with HMDS, the amounts of HMDS and water were adjusted such that the amount of carbon was the same as that of the inorganic fine particle 1. Table 2 shows the physical properties of the inorganic fine particle 2 to 5.

<Production Example of Inorganic Fine Particle 6>

Fine dry silica particles (hydrophobic treatment with HMDS, BET specific surface area: 200 $m^2/g$) were used as inorganic fine particle 6. Table 2 shows the physical properties of the inorganic fine particle 6.

TABLE 2

| | Amount of methanol [parts] | Drop time of tetramethoxysilane [h] | Drop time of 5.4% aqueous ammonia [h] | Primary particle major diameter [nm] |
|---|---|---|---|---|
| Inorganic fine particle 1 | 589.6 | 6 | 5 | 100 |
| Inorganic fine particle 2 | 695.1 | 7 | 6 | 60 |
| Inorganic fine particle 3 | 434.6 | 7 | 6 | 300 |
| Inorganic fine particle 4 | 878.5 | 5 | 4 | 40 |
| Inorganic fine particle 5 | 396.8 | 7 | 6 | 400 |
| Inorganic fine particle 6 | — | — | — | 15 |

<Production Example of Toner Particles 1>

The following materials were mixed in an attritor (Nippon Coke & Engineering Co., Ltd.) and were dissolved while stirring for two hours, thus preparing a monomer composition.

Styrene 36.0 parts by mass n-Butyl acrylate 28.0 parts by mass

Charge control agent Bontron E-88 (manufactured by Orient Chemical Industries Co., Ltd.) 1.0 part by mass Amorphous polyester (a saturated polyester produced by a condensation polymerization reaction between a 2-mol ethylene oxide adduct of bisphenol A and terephthalic acid (number-average molecular weight=5000, acid value=6 mgKOH/g, glass transition temperature=68° C.)) 3.0 parts by mass The following materials were mixed and stirred together with zirconia beads (3/16 inches) in an attritor (manufactured by Nippon Coke & Engineering Co., Ltd.) at 1.7 m/s for 3 hours. The beads were removed to prepare a colorant dispersion liquid.

Styrene 36.0 parts by mass

Colorant (C.I. Pigment Blue 15:3 (manufactured by Dainichiseika Color & Chemicals Mfg. Co., Ltd.)) 6.0 parts by mass A mixture of the following materials was then prepared.

Monomer composition 75.0 parts by mass

Colorant dispersion liquid 42.25 parts by mass

The mixture was heated to 60° C., and 20.0 parts by mass of the wax 1 and 10.0 parts by weight of the wax 5 were added to the mixture. Next, 10.0 parts by mass of a polymerization initiator (2,2'-azobis(2,4-dimethylvaleronitrile)) was added to the mixture, which was then stirred for 5 minutes to prepare a polymerizable monomer composition.

850 parts by mass of 0.1 mol/L aqueous $Na_3PO_4$ and 8.0 parts by mass of 10% hydrochloric acid in a vessel equipped with a high-speed agitator Clearmix (manufactured by M Technique Co., Ltd.) were heated to 60° C. at a rotation speed of 33 m/s. 68 parts by mass of 1.0 mol/L aqueous $CaCl_2$ was added to the mixture to prepare an aqueous medium containing a fine hardly-water-soluble dispersant $Ca_3(PO_4)_2$.

Five minutes after the addition of the polymerization initiator, the polymerizable monomer composition at 60° C. was added to the aqueous medium heated to a temperature of 60° C. and was granulated for 15 minutes while the Clearmix was rotated at 33 m/s.

Subsequently, while stirring with a propeller stirrer, the mixture was allowed to react at a temperature of 70° C. for 5 hours, was then heated to a temperature of 85° C., and was allowed to react for another 4 hours, thereby producing toner particles. After completion of the polymerization reaction, the suspension was heated to 100° C. and was held for 2 hours. The residual monomer was removed by heating under reduced pressure. In a subsequent cooling step, the suspension was cooled at 120° C./min (cooling rate) from 95° C. (starting temperature) to 45° C. (final temperature). In an annealing step after the cooling, the suspension was heated to 50° C. and was held for 120 minutes. After the annealing step, hydrochloric acid was added to decrease the pH to 2.0 or less and dissolve the hardly-water-soluble dispersant. After washing with water several times, drying with a dryer at 40° C. for 72 hours, and then classification with a multi-division classifier utilizing the Coanda effect, toner particles 1 were produced. Table 3 shows the physical properties of the toner particles 1.

<Production Examples of Toner Particles 2 to 18 and Toner Particles 21 and 22>

Toner particles 2 to 18 and toner particles 21 and 22 were produced in the same manner as the toner particles 1 except that the preparation of the aqueous medium, the type of wax, the amount of wax to be added, the quenching rate in the cooling step, and the temperature in the annealing step were changed as shown in Table 3. Table 3 shows the physical properties of the toner particles 2 to 18 and the toner particles 21 and 22.

<Production Example of Toner Particles 19>

Binder resin (styrene-n-butyl acrylate copolymer (copolymerization ratio=79.0:21.0, Tg=50° C.)) 100.0 parts by mass Colorant (C.I. Pigment Blue 15:3 (manufactured by Dainichiseika Color & Chemicals Mfg. Co., Ltd.)) 6.0 parts by mass Wax 510.0 parts Charge-controlling agent (Bontron E-88, manufactured by Orient Chemical Industries Co., Ltd.) 2.0 parts These materials were premixed in a Henschel mixer and were then melt-kneaded with a twin-screw extruder (PCM-30 manufactured by Ikegai Corporation) to produce a kneaded product.

The kneaded product was cooled, was roughly crushed with a hammer mill, and was then pulverized with a mechanical grinder (T-250 manufactured by Turbo Kogyo Co., Ltd.). The resulting finely ground powder was classified with a multi-division classifier utilizing the Coanda effect to produce toner particles 19. Table 3 shows the physical properties of the toner particles 19.

<Production Example of Toner Particles 20>

Preparation of Dispersion Liquid of Fine Resin Particles

The following materials were mixed in a flask to prepare an aqueous medium.

Deionized water 500.0 parts by mass

Nonionic surface-active agent Nonipol 400 (manufactured by Sanyo Chemical Industries, Ltd.) 6.0 parts by mass Anionic surface-active agent Neogen SC (manufactured by Dai-ichi Kogyo Seiyaku Co., Ltd.) 10.0 parts by mass A mixed solution of the following materials was prepared.

Styrene 79.0 parts by mass n-Butyl acrylate 21.0 parts by mass

Charge control agent Bontron E-88 (manufactured by Orient Chemical Industries Co., Ltd.) 1.0 part by mass The mixed solution was dispersed and emulsified in the aqueous medium. 50 parts by mass of a deionized water solution containing 4.0 parts by mass of ammonium persulfate as a polymerization initiator dissolved therein was added to the mixed solution while slowly stirring and mixing for 10 minutes. Next, after the interior of the system was fully replaced with nitrogen, the flask was heated in an oil bath while stirring until the interior of the system was heated to 70° C., and the polymerization reaction was performed for five hours. Thus, a dispersion liquid of fine anionic resin particles was prepared. Preparation of Dispersion Liquid of Fine Colorant Particles The following materials were dispersed with Ultra-Turrax T50 (manufactured by IKA) for 10 minutes to prepare a dispersion liquid of fine colorant particles.

Deionized water 100.0 parts by mass

Colorant (C.I. Pigment Blue 15:3 (manufactured by Dainichiseika Color & Chemicals Mfg. Co., Ltd.)) 6.0 parts by mass Nonionic surface-active agent (Nonipol 400 (manufactured by Sanyo Chemical Industries, Ltd.)) 1.0 part by mass Preparation of Dispersion Liquid of Fine Wax Particles Deionized water 100.0 parts by mass Wax 510.0 parts by mass Cationic surface-active agent Sanisol B50 (manufactured by Kao Corporation) 5.0 parts by mass These components were heated to a temperature of 95° C., were sufficiently dispersed with the Ultra-Turrax T50, and were then dispersed with a pressure jet homogenizer to prepare a dispersion liquid of fine wax particles.

Preparation of Dispersion Liquid of Fine Resin Particles

The following materials were mixed, were then emulsified with the Ultra-Turrax T50, and were held at 80° C. for 6 hours to remove the solvent and prepare a dispersion liquid of fine resin particles.

Deionized water 100.0 parts by mass

Ethyl acetate 50.0 parts by mass

Resin (styrene/methyl methacrylate/methacrylic acid/2-hydroxyethyl methacrylate copolymer, weight-average molecular weight 14,000, number-average molecular weight 6000, peak top molecular weight 14,000, glass transition temperature 92° C., acid value 20 mgKOH/g, hydroxyl value 10 mgKOH/g) 10.0 parts by mass Production of Toner Particles The dispersion liquid of fine resin particles, the dispersion liquid of fine colorant particles, the dispersion liquid of fine wax particles, and 1.2 parts by mass of poly(aluminum chloride) were mixed and were sufficiently dispersed in a round stainless steel flask with the Ultra-Turrax T50. The flask was then heated to 51° C. in a heating oil bath while stirring. After holding at a temperature of 51° C. for 60 minutes, the dispersion liquid of fine resin particles was added to the mixture. Subsequently, the pH of the system was adjusted to 6.5 with aqueous sodium hydroxide with a concentration of 0.5 mol/L. The stainless steel flask was then tightly closed, was heated to a temperature of 95° C. while stirring and magnetically sealing the stirring shaft, and was held for 6 hours.

After completion of the reaction, the product was allowed to cool to 20° C. and was filtered, washed, dried, and classified to prepare toner particles 20. Table 3 shows the physical properties of the toner particles 20.

Toner particles 6: a change to 840 parts in aqueous $Na_3PO_4$, 8.8 parts in 10% hydrochloric acid, and 75 parts in aqueous $CaCl_2$.

Toner particles 7: a change to 865 parts in aqueous $Na_3PO_4$, 5.5 parts in 10% hydrochloric acid, and 47 parts in aqueous $CaCl_2$.

Toner particles 8: a change to 830 parts in aqueous $Na_3PO_4$, 9.6 parts in 10% hydrochloric acid, and 82 parts in aqueous $CaCl_2$.

Toner particles 9: a change to 876 parts in aqueous $Na_3PO_4$, 3.9 parts in 10% hydrochloric acid, and 33 parts in aqueous $CaCl_2$.

<Production Example of Toner 1>

Figure 2A:
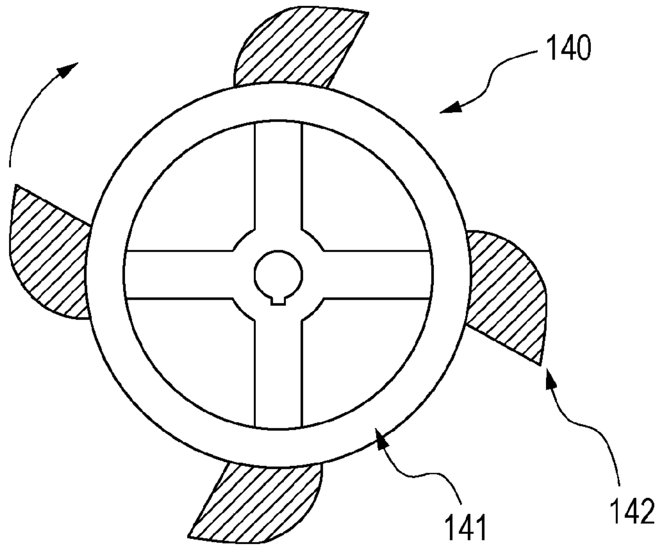
FIGS. 2A and 2B are schematic views of a rotor usable in a mixing apparatus used in an external addition step of the present disclosure.
Figure 2B:
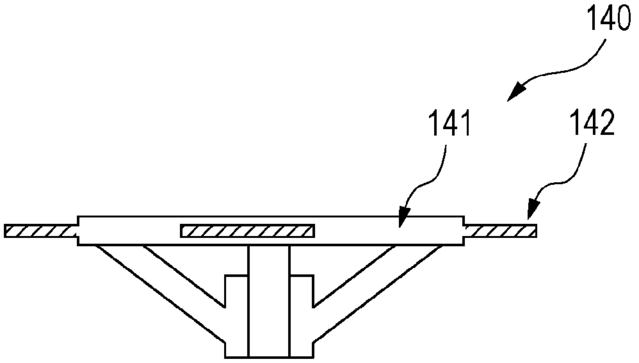
Figure 3A:
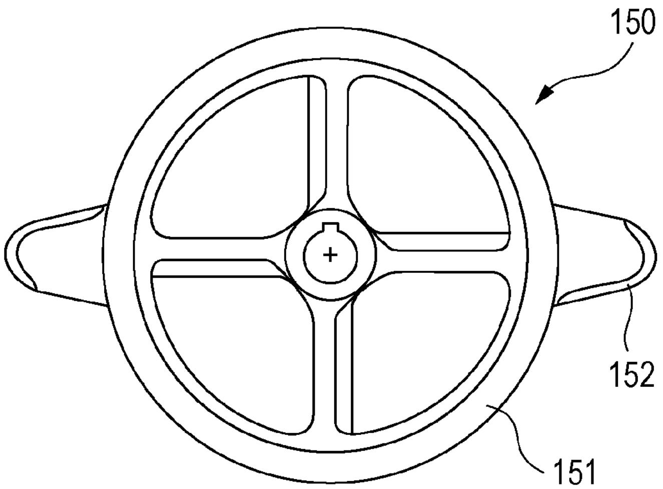
FIGS. 3A and 3B are schematic views of a rotor usable in a mixing apparatus used in the external addition step of the present disclosure.
Figure 3B:
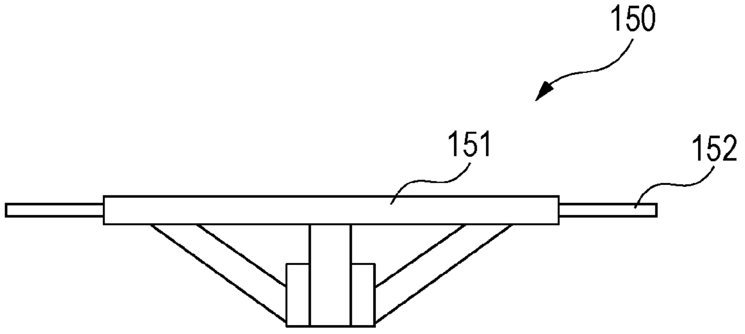

100.0 parts of the toner particles 1 and 0.5 parts of the inorganic fine particle 1 (inorganic fine particle (X)) were put into an FM mixer (FM10C manufactured by Nippon Coke & Engineering Co., Ltd.) in which the rotor of FIGS. 3A and 3B was changed to the rotor of FIGS. 2A and 2B. A first external addition was then performed at 2000 rpm for 10 minutes to prepare a toner precursor 1-1.

Simultaneously with the start of mixing, hot water and cold water were appropriately passed through the jacket to maintain the temperature in the vessel at 45° C.

In a subsequent second external addition, 100 parts by mass of the toner precursor 1-1 and 0.5 parts of the inorganic fine particle 6 were put into the FM mixer (FM10C manufactured by Nippon Coke & Engineering Co., Ltd.) in which water at 7° C. was passed through the jacket. After the water temperature in the jacket was stabilized at 7° C.±1° C., a toner precursor 1-2 was prepared after mixing at 3000 rpm for 5 minutes. The water flow rate in the jacket was appropriately controlled such that the temperature in the vessel of the FM mixer did not exceed 25° C.

TABLE 3

| Toner particle | Formulation of toner particle | | | | Method for producing toner particle | | | | | Physical properties | |
|---|---|---|---|---|---|---|---|---|---|---|---|
| | Wax | | | | Cooling step | | | Annealing step | | Weight-average particle diameter | Glass transition temperature |
| Type | Type | Parts | Type | Parts | Start temperature (° C.) | Cooling rate (° C./min) | End temperature (° C.) | Temperature (° C.) | Time (min) | D4 (μm) | Tg (° C.) |
| 1 | 1 | 20 | 5 | 10 | 95 | 120 | 45 | 50 | 120 | 6.2 | 51 |
| 2 | 2 | 20 | 5 | 10 | 95 | 120 | 45 | 50 | 120 | 6.1 | 52 |
| 3 | 1 | 20 | 5 | 10 | 95 | 200 | 45 | 50 | 120 | 6.2 | 52 |
| 4 | 1 | 20 | 5 | 10 | 95 | 40 | 45 | 50 | 120 | 6.4 | 53 |
| 5 | 1 | 15 | 5 | 5 | 95 | 120 | 45 | 50 | 120 | 6.0 | 52 |
| 6 | 1 | 15 | 5 | 5 | 95 | 120 | 45 | 50 | 120 | 5.3* | 51 |
| 7 | 1 | 15 | 5 | 5 | 95 | 120 | 45 | 50 | 120 | 8.8* | 54 |
| 8 | 1 | 15 | 5 | 5 | 95 | 120 | 45 | 50 | 120 | 3.9* | 51 |
| 9 | 1 | 15 | 5 | 5 | 95 | 120 | 45 | 50 | 120 | 11.0* | 52 |
| 10 | 1 | 10 | 5 | 5 | 95 | 120 | 45 | 50 | 120 | 6.2 | 52 |
| 11 | 1 | 10 | 5 | 5 | 95 | 120 | 45 | 55 | 120 | 6.3 | 53 |
| 12 | 1 | 10 | 5 | 5 | 95 | 120 | 45 | 45 | 120 | 6.0 | 52 |
| 13 | 4 | 10 | 5 | 5 | 95 | 120 | 45 | 45 | 120 | 6.1 | 51 |
| 14 | 1 | 8 | 5 | 3 | 95 | 120 | 45 | 50 | 120 | 6.1 | 53 |
| 15 | 1 | 25 | 5 | 15 | 95 | 120 | 45 | 50 | 120 | 6.3 | 52 |
| 16 | 1 | 13 | — | 1 | 95 | 120 | 45 | 50 | 120 | 6.3 | 51 |
| 17 | 3 | 8 | 5 | 3 | 95 | 120 | 45 | 50 | 120 | 6.1 | 50 |
| 18 | 4 | 10 | 5 | 5 | 95 | 120 | 45 | 50 | 120 | 6.2 | 52 |
| 19 | — | — | 5 | 10 | — | — | — | — | — | 6.3 | 53 |
| 20 | — | — | 5 | 10 | — | — | — | — | — | 6.1 | 52 |
| 21 | 1 | 20 | 5 | 10 | 95 | 120 | 45 | 50 | 120 | 6.1 | 51 |
| 22 | 1 | 30 | 5 | 15 | 95 | 120 | 45 | 50 | 120 | 6.2 | 50 |

The toner precursor 1-2 was sieved through a mesh with a sieve opening of 75 μm to prepare a toner 1 (cyan toner). Table 5 shows the physical properties of the toner 1.

The FM10C has the rotor illustrated in FIGS. 3A and 3B at the time of sale. In FIGS. 2A and 2B and FIGS. 3A and 3B, reference numerals 140 and 150 denote processing blades, reference numerals 141 and 151 denote main bodies of the processing blades, and reference numerals 142 and 152 denote processing units. FIGS. 2A and 3A are top views, and FIGS. 2B and 3B are side views.

<Production Examples of Toners 2 to 37>

Toners 2 to 37 were produced in the same manner as the toner 1 except that the type of toner particles, the type and parts of the inorganic fine particle (X), whether or not the processing blade was changed, the conditions for the first external addition, and the presence or absence of the second external addition were changed as shown in Table 4. Table 5 shows the physical properties of the toners 2 to 37.

TABLE 4

| | Toner particle | Inorganic fine particle (X) | | First external addition | | | | Second external |
|---|---|---|---|---|---|---|---|---|
| | Type | Type | Parts | Blade structure | Time [min] | Rotation speed [rpm] | Temperature [° C.] | addition |
| Toner 1 | 1 | 1 | 0.5 | FIGS. 2A and 2B | 10 | 2000 | 45 | Yes |
| Toner 2 | 2 | 1 | 0.5 | FIGS. 2A and 2B | 10 | 2000 | 45 | Yes |
| Toner 3 | 3 | 1 | 0.5 | FIGS. 2A and 2B | 10 | 2000 | 45 | Yes |
| Toner 4 | 4 | 1 | 0.5 | FIGS. 2A and 2B | 10 | 2000 | 45 | Yes |
| Toner 5 | 1 | 1 | 0.2 | FIGS. 3A and 3B | 10 | 2000 | 45 | Yes |
| Toner 6 | 1 | 1 | 0.8 | FIGS. 3A and 3B | 10 | 2000 | 45 | Yes |
| Toner 7 | 1 | 1 | 0.1 | FIGS. 3A and 3B | 10 | 2000 | 45 | Yes |
| Toner 8 | 5 | 1 | 0.5 | FIGS. 3A and 3B | 10 | 2000 | 45 | Yes |
| Toner 9 | 5 | 1 | 0.5 | FIGS. 3A and 3B | 15 | 2000 | 45 | No |
| Toner 10 | 5 | 1 | 0.5 | FIGS. 3A and 3B | 10 | 2000 | 40 | Yes |
| Toner 11 | 5 | 1 | 0.5 | FIGS. 3A and 3B | 10 | 2000 | 35 | Yes |
| Toner 12 | 6 | 1 | 0.6 | FIGS. 3A and 3B | 10 | 2000 | 35 | Yes |
| Toner 13 | 7 | 1 | 0.4 | FIGS. 3A and 3B | 10 | 2000 | 35 | Yes |
| Toner 14 | 8 | 1 | 0.7 | FIGS. 3A and 3B | 10 | 2000 | 35 | Yes |
| Toner 15 | 9 | 1 | 0.2 | FIGS. 3A and 3B | 10 | 2000 | 35 | Yes |
| Toner 16 | 10 | 1 | 0.2 | FIGS. 3A and 3B | 10 | 2000 | 35 | Yes |
| Toner 17 | 11 | 1 | 0.2 | FIGS. 3A and 3B | 10 | 2000 | 35 | Yes |
| Toner 18 | 12 | 1 | 0.2 | FIGS. 3A and 3B | 10 | 2000 | 35 | Yes |
| Toner 19 | 10 | 2 | 0.1 | FIGS. 3A and 3B | 10 | 2000 | 35 | Yes |
| Toner 20 | 10 | 3 | 0.7 | FIGS. 3A and 3B | 10 | 2000 | 35 | Yes |
| Toner 21 | 10 | 4 | 0.1 | FIGS. 3A and 3B | 10 | 2000 | 35 | Yes |
| Toner 22 | 13 | 4 | 0.1 | FIGS. 3A and 3B | 10 | 2000 | 35 | Yes |
| Toner 23 | 10 | 5 | 0.9 | FIGS. 3A and 3B | 10 | 2000 | 35 | Yes |
| Toner 24 | 14 | 5 | 0.9 | FIGS. 3A and 3B | 10 | 2000 | 35 | Yes |
| Toner 25 | 14 | 1 | 0.9 | FIGS. 3A and 3B | 15 | 2000 | 35 | No |
| Toner 26 | 14 | 1 | 0.9 | FIGS. 3A and 3B | 15 | 1600 | 35 | No |
| Toner 27 | 14 | 1 | 0.9 | FIGS. 3A and 3B | 40 | 1600 | 35 | No |
| Toner 28 | 14 | 1 | 0.9 | FIGS. 3A and 3B | 5 | 1600 | 35 | No |
| Toner 29 | 15 | 1 | 0.1 | FIGS. 3A and 3B | 5 | 2000 | 35 | No |
| Toner 30 | 16 | 1 | 0.9 | FIGS. 3A and 3B | 40 | 1300 | 35 | No |
| Toner 31 | 17 | 1 | 0.9 | FIGS. 3A and 3B | 40 | 1300 | 35 | No |
| Toner 32 | 17 | 1 | 1.8 | FIGS. 3A and 3B | 40 | 1300 | 35 | No |
| Toner 33 | 18 | 1 | 0.1 | FIGS. 3A and 3B | 5 | 2000 | 20 | Yes |
| Toner 34 | 19 | 1 | 0.5 | FIGS. 3A and 3B | 5 | 2000 | 20 | Yes |
| Toner 35 | 20 | 1 | 0.5 | FIGS. 3A and 3B | 5 | 2000 | 20 | Yes |
| Toner 36 | 21 | 1 | 0.5 | FIGS. 3A and 3B | 5 | 2000 | 20 | Yes |
| Toner 37 | 22 | 1 | 0.5 | FIGS. 3A and 3B | 5 | 2000 | 20 | Yes |

TABLE 5

| | Physical properties of toner | | | | | | | | | | | |
|---|---|---|---|---|---|---|---|---|---|---|---|---|
| Toner Type | D4 (μm) | Tg (° C.) | R1 (%) | R2 (%) | R1/R2 | Standard deviation (nm) | A2-A1 (nm) | A1 (nm) | A2 (nm) | A3 (nm) | Dispersity of inorganic fine particle (nm) | Coverage X (%) |
| 1 | 6.1 | 51 | 8.0 | 8.7 | 0.92 | 15 | 50 | 80 | 130 | 2215 | 0.8 | 5.0 |
| 2 | 6.2 | 52 | 7.7 | 8.9 | 0.87 | 21 | 45 | 92 | 137 | 2087 | 0.9 | 5.0 |
| 3 | 6.0 | 52 | 10.2 | 12.0 | 0.85 | 28 | 52 | 63 | 115 | 2031 | 0.8 | 5.0 |
| 4 | 6.3 | 53 | 6.0 | 6.7 | 0.90 | 13 | 61 | 118 | 179 | 2286 | 0.7 | 5.0 |
| 5 | 6.2 | 52 | 7.6 | 8.5 | 0.89 | 18 | 47 | 82 | 129 | 2210 | 1.6 | 2.0 |
| 6 | 6.0 | 51 | 8.2 | 8.7 | 0.94 | 16 | 45 | 83 | 128 | 2231 | 0.8 | 8.0 |
| 7 | 6.0 | 51 | 7.4 | 8.1 | 0.91 | 17 | 46 | 81 | 127 | 2251 | 1.9 | 1.0 |
| 8 | 6.1 | 52 | 6.8 | 7.6 | 0.90 | 17 | 43 | 88 | 131 | 1324 | 0.6 | 5.0 |
| 9 | 6.2 | 52 | 7.2 | 8.2 | 0.88 | 22 | 38 | 100 | 138 | 1341 | 2.2 | 5.0 |
| 10 | 6.3 | 53 | 5.6 | 6.6 | 0.85 | 19 | 35 | 95 | 128 | 1331 | 1.3 | 5.0 |
| 11 | 6.0 | 52 | 5.1 | 6.7 | 0.76 | 22 | 32 | 99 | 131 | 1315 | 1.4 | 5.0 |

TABLE 5-continued

| | Physical properties of toner | | | | | | | | | | | | |
|---|---|---|---|---|---|---|---|---|---|---|---|---|---|
| Toner Type | D4 (μm) | Tg (° C.) | R1 (%) | R2 (%) | R1/R2 | Standard deviation (nm) | A2-A1 (nm) | A1 (nm) | A2 (nm) | A3 (nm) | Dispersity of inorganic fine particle (nm) | Coverage X (%) |
| 12 | 5.2 | 51 | 6.0 | 7.6 | 0.79 | 18 | 31 | 93 | 124 | 1326 | 1.3 | 5.0 |
| 13 | 8.9 | 54 | 5.3 | 7.2 | 0.74 | 25 | 32 | 95 | 124 | 1308 | 1.1 | 5.0 |
| 14 | 4.8 | 51 | 6.4 | 8.1 | 0.79 | 17 | 30 | 91 | 118 | 1352 | 1.3 | 5.0 |
| 15 | 11.2 | 52 | 5.1 | 6.9 | 0.74 | 26 | 32 | 96 | 125 | 1341 | 1.2 | 5.0 |
| 16 | 6.2 | 52 | 4.8 | 6.4 | 0.75 | 16 | 33 | 90 | 131 | 921 | 1.1 | 2.0 |
| 17 | 6.0 | 53 | 4.3 | 5.5 | 0.78 | 17 | 32 | 114 | 146 | 925 | 1.2 | 2.0 |
| 18 | 6.1 | 52 | 5.5 | 7.6 | 0.72 | 23 | 31 | 89 | 120 | 913 | 1.1 | 2.0 |
| 19 | 6.0 | 51 | 4.1 | 5.8 | 0.71 | 32 | 30 | 98 | 128 | 928 | 1.5 | 2.0 |
| 20 | 6.3 | 53 | 5.1 | 6.7 | 0.76 | 24 | 34 | 92 | 126 | 934 | 1.8 | 2.0 |
| 21 | 6.0 | 52 | 4.0 | 5.7 | 0.70 | 31 | 31 | 96 | 127 | 921 | 1.8 | 2.0 |
| 22 | 6.1 | 51 | 4.5 | 6.0 | 0.75 | 28 | 33 | 94 | 127 | 908 | 1.8 | 2.0 |
| 23 | 6.1 | 51 | 5.5 | 7.1 | 0.77 | 25 | 33 | 98 | 131 | 931 | 2.4 | 2.0 |
| 24 | 6.2 | 52 | 4.7 | 6.0 | 0.78 | 30 | 30 | 98 | 128 | 613 | 2.1 | 2.0 |
| 25 | 6.3 | 51 | 5.1 | 7.8 | 0.65 | 47 | 31 | 118 | 149 | 625 | 2.5 | 2.0 |
| 26 | 6.1 | 52 | 4.9 | 6.9 | 0.71 | 38 | 29 | 115 | 144 | 631 | 2.2 | 2.0 |
| 27 | 6.2 | 52 | 5.5 | 9.0 | 0.61 | 53 | 20 | 131 | 151 | 622 | 2.9 | 2.0 |
| 28 | 6.0 | 53 | 2.4 | 3.6 | 0.66 | 43 | 18 | 132 | 150 | 613 | 2.1 | 2.0 |
| 29 | 6.1 | 52 | 12.2 | 20.3 | 0.60 | 45 | 19 | 114 | 133 | 2641 | 1.9 | 2.0 |
| 30 | 6.2 | 51 | 2.1 | 3.2 | 0.65 | 47 | 21 | 130 | 151 | 513 | 2.2 | 2.0 |
| 31 | 6.1 | 50 | 2.2 | 3.5 | 0.63 | 45 | 22 | 179 | 201 | 631 | 2.2 | 2.0 |
| 32 | 6.0 | 51 | 2.0 | 3.1 | 0.65 | 44 | 23 | 181 | 204 | 628 | 2.3 | 5.0 |
| 33 | 6.3 | 52 | 0.9 | 1.3 | 0.70 | 16 | 15 | 381 | 396 | 915 | 1.3 | 1.0 |
| 34 | 6.0 | 53 | 5.1 | 10.6 | 0.48 | 48 | 14 | 134 | 148 | 152 | 1.8 | 5.0 |
| 35 | 6.2 | 52 | 5.6 | 11.0 | 0.51 | 31 | 15 | 135 | 150 | 153 | 1.7 | 5.0 |
| 36 | 6.2 | 51 | 2.6 | 4.7 | 0.55 | 53 | 13 | 118 | 131 | 2513 | 1.1 | 5.0 |
| 37 | 6.3 | 50 | 16.1 | 53.7 | 0.30 | 71 | 10 | 115 | 125 | 3025 | 1.3 | 5.0 |

Abbreviations in Table 5 are described below.

D4: Weight-average particle diameter of toner

Tg: Glass transition temperature of toner

R1: a percentage ratio of sum of areas of the small domains (the domains having a major diameter of 10 to 120 nm) present in the first region with respect to the area of the first region R2: a percentage ratio of sum of areas of all the domains present in the first region with respect to an area of the first region Standard deviation: the standard deviation of major diameters of all the domains present in the first region A1: The number average of the major diameters of all wax domains present in the first region A2: The number average of the major diameters of all wax domains present in the second region A3: The number average of the major diameters of all wax domains present in the third region Coverage X: Coverage of the surface of the toner particle with inorganic fine particle (X)

Example 1

The toner 1 was examined as described below. Table 6 show the results.

<Evaluation of Low-Temperature Fixability of Toner>

First, a fixing unit was taken out from a modified laser printer (trade name: HP LaserJet Enterprise M553X, manufactured by HP). The modification point of the modified machine is that the toner coverage can be arbitrarily set to obtain an unfixed image. The fixing unit taken out was modified such that the temperature of the fixing unit can be arbitrarily set. A white paper sheet (trade name: prober bond paper (105 g/m$^2$), manufactured by Fox River) was left in a normal-temperature and high-humidity environment (at a temperature of 25° C. and at a humidity of 80% RH) for three days.

The low-temperature fixability of toner was evaluated using the modified machine, the modified fixing unit, and the white paper. An unfixed image that has a toner coverage per unit area set at 0.5 mg/cm$^2$ was prepared with the modified machine. The unfixed image was then passed through the fixing unit set at 150° C. in a normal-temperature and high-humidity environment (at a temperature of 25° C. and at a humidity of 80% RH) to form a fixed image.

After the image density of the fixed image was measured, the fixed image was rubbed with lens-cleaning paper under a load of 4.9 kPa (50 g/cm$^2$), and the image density of the fixed image was measured again. A rate of decrease (%) in image density due to the rubbing was calculated, and the low-temperature fixability of toner was evaluated on the basis of the rate of decrease. Table 6 shows the results. When the rate of decrease (%) in image density was less than 20.0%, it was judged that the toner had the advantages of the present disclosure. The image density was measured with a Macbeth densitometer (manufactured by GretagMacbeth GmbH), which is a reflection densitometer, and with an SPI filter.

<Evaluation of Image Density in High-Temperature and High-Humidity Environment>

The image density was evaluated when an image was output in a high-temperature and high-humidity environment using a modified laser printer (trade name: HP LaserJet Enterprise M553X, manufactured by HP) and a white sheet (trade name: PB PAPER, manufactured by Canon Marketing Japan Inc., basis weight 66 g/cm$^2$, letter). The modification point of the modified machine was that the process speed was changed to 400 mm/s.

First, after toner in the cartridge was completely removed, the cartridge was filled with 300 g of the toner 1.

Two sheets of a horizontal line pattern with a printing rate of 1.5% were output in one job. The mode was set such that the machine stops temporarily before the next job, and 5000 sheets of images were output in a high-temperature and high-humidity environment (at a temperature of 32.5° C. and at a humidity of 85% RH).

After the 5000 sheets of images were output, a sheet of an image was output. The image included a total of nine 5 mm×5 mm solid black images at three left, right, and center positions with a leading edge margin of 5 mm and with left and right margins of 5 mm at intervals of 30 mm in the longitudinal direction.

The image densities of the nine solid black images in the image were measured and averaged. The image density when an image was output in a high-temperature and high-humidity environment was evaluated on the basis of the average. Table 6 shows the results. The image density was measured with a Macbeth densitometer (manufactured by GretagMacbeth GmbH), which is a reflection densitometer, and with an SPI filter. In the measurement, an image density of 1.20 or more is judged to be good.

<Evaluation of Lack in Image in High-Temperature and High-Humidity Environment>

A lack in image in image output in a high-temperature and high-humidity environment was evaluated using the modified machine and the white sheet used in the evaluation of the image density in the high-temperature and high-humidity environment.

Two sheets of a horizontal line pattern with a printing rate of 1.5% were output in one job. The mode was set such that the machine stops temporarily before the next job, and 5000 sheets of images were output in a high-temperature and high-humidity environment (at a temperature of 32.5° C. and at a humidity of 85% RH).

Before and after the image output of 5000 sheets, a solid image was output over the entire surface with a leading edge margin of 5 mm and with right and left margins of 5 mm. The developing bias was adjusted such that the image density of each solid image ranged from 1.50 to 1.55 measured with the Macbeth densitometer. A sheet of an image including 100 dots with a diameter of 180 μm was then output with the adjusted bias setting. The number of dots with a lack in image out of the 100 dots in the image was visually counted, and the lack in image in a high-humidity environment was evaluated on the basis of the number. 20 or less dots with a lack in image was judged that the toner had the advantages of the present disclosure.

Examples 2 to 31 and Comparative Examples 1 to 6

The toners 1 to 37 were examined in the same manner except that the toner 1 was changed to the toner shown in Table 6. Table 1 shows the results.

TABLE 6

| | Toner | Low-temperature fixability Rate of decrease in image density (%) | Image density (in high-temperature and high-humidity environment) | Lack in image (in high-temperature and high-humidity environment) |
|---|---|---|---|---|
| Exemplary embodiment 1 | Toner 1 | 5.6 | 1.4 | 1 |
| Exemplary embodiment 2 | Toner 2 | 6.5 | 1.4 | 1 |
| Exemplary embodiment 3 | Toner 3 | 4.8 | 1.4 | 2 |
| Exemplary embodiment 4 | Toner 4 | 6.3 | 1.4 | 2 |
| Exemplary embodiment 5 | Toner 5 | 5.2 | 1.4 | 2 |
| Exemplary embodiment 6 | Toner 6 | 6.0 | 1.4 | 3 |
| Exemplary embodiment 7 | Toner 7 | 5.0 | 1.4 | 4 |
| Exemplary embodiment 8 | Toner 8 | 7.6 | 1.4 | 3 |
| Exemplary embodiment 9 | Toner 9 | 7.8 | 1.4 | 5 |
| Exemplary embodiment 10 | Toner 10 | 8.5 | 1.4 | 3 |
| Exemplary embodiment 11 | Toner 11 | 9.0 | 1.4 | 6 |
| Exemplary embodiment 12 | Toner 12 | 6.5 | 1.4 | 7 |
| Exemplary embodiment 13 | Toner 13 | 9.2 | 1.4 | 7 |
| Exemplary embodiment 14 | Toner 14 | 6.1 | 1.4 | 9 |
| Exemplary embodiment 15 | Toner 15 | 9.7 | 1.4 | 9 |
| Exemplary embodiment 16 | Toner 16 | 11.9 | 1.4 | 7 |
| Exemplary embodiment 17 | Toner 17 | 11.8 | 1.4 | 8 |
| Exemplary embodiment 18 | Toner 18 | 11.2 | 1.4 | 9 |
| Exemplary embodiment 19 | Toner 19 | 12.1 | 1.4 | 8 |
| Exemplary embodiment 20 | Toner 20 | 12.4 | 1.4 | 8 |
| Exemplary embodiment 21 | Toner 21 | 11.8 | 1.4 | 9 |
| Exemplary embodiment 22 | Toner 22 | 10.6 | 1.4 | 8 |
| Exemplary embodiment 23 | Toner 23 | 12.5 | 1.4 | 10 |
| Exemplary embodiment 24 | Toner 24 | 14.3 | 1.4 | 8 |
| Exemplary embodiment 25 | Toner 25 | 13.8 | 1.3 | 10 |
| Exemplary embodiment 26 | Toner 26 | 14.5 | 1.3 | 9 |
| Exemplary embodiment 27 | Toner 27 | 14.8 | 1.3 | 10 |
| Exemplary embodiment 28 | Toner 28 | 15.1 | 1.3 | 12 |
| Exemplary embodiment 29 | Toner 29 | 10.5 | 1.3 | 15 |
| Exemplary embodiment 30 | Toner 30 | 15.5 | 1.3 | 13 |
| Exemplary embodiment 31 | Toner 31 | 15.3 | 1.3 | 13 |
| Exemplary embodiment 32 | Toner 32 | 16.1 | 1.3 | 13 |
| Comparative example 1 | Toner 33 | 21.2 | 1.3 | 21 |
| Comparative example 2 | Toner 34 | 13.5 | 1.3 | 28 |
| Comparative example 3 | Toner 35 | 14.5 | 1.3 | 22 |
| Comparative example 4 | Toner 36 | 15.8 | 1.3 | 21 |
| Comparative example 5 | Toner 37 | 12.5 | 1.2 | 29 |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-142844 filed Aug. 26, 2020 and Japanese Patent Application No. 2021-118784 filed Jul. 19, 2021, which are hereby incorporated by reference herein in their entirety.

What is claimed is:

1. A toner comprising:

a toner particle containing a resin component and a wax; and an inorganic fine particle on a surface of the toner particle, wherein in the cross section of the toner particle, domains including the wax are present in a first region ranging from a surface of the toner particle to a depth of 600 nm from the surface, wherein when a percentage ratio of sum of areas of all the domains present in the first region with respect to an area of the first region is defined as R2, and when a percentage ratio of sum of areas of the domains having a major diameter of 10 to 120 nm present in the first region with respect to the area of the first region is defined as R1, R1 and R2 satisfy the following formulae (1) and (2):

$$2.0 \leq R1(\%) \leq 15.0 \quad \text{formula (1)}$$

$$R1(\%)/R2(\%) \geq 0.60 \quad \text{formula (2).}$$

2. The toner according to claim 1, wherein a standard deviation of major diameters of all the domains present in the first region is 40 nm or less.

3. The toner according to claim 1, wherein A1 and A2 satisfy the following formula (3), wherein the A1 is a number average of major diameters of all the domains present in the first region and the A2 is a number average of major diameters of all the domains present in a second region in the cross section, the second region ranging from a depth of 600 nm from the surface of the toner particle to a depth of 1500 nm from the surface of the toner particle $$A2-A1 \geq 30 \text{ nm} \quad \text{formula (3).}$$

4. The toner according to claim 1, wherein A1 is 50-200 nm, wherein A1 is a number average of major diameters of all the domains present in the first region.

5. The toner according to claim 1, wherein A2 is 110-210 nm, wherein A2 is a number average of major diameters of all the domains present in a second region in the cross section of the toner particle, the second region ranging from a depth of 600 nm from the surface of the toner particle to a depth of 1500 nm from the surface of the toner particle.

6. The toner according to claim 1, wherein A1, A2, and A3 satisfy the following formulae (4) and (5), wherein A1 is a number average of major diameters of all the domains present in the first region A2 is a number average of major diameters of all the domains present in a second region in the cross section, the second region ranging from a depth of 600 nm from the surface of the toner particle to a depth of 1500 nm from the surface of the toner particle, and A3 is a number average of major diameters of all the domains present in a third region in the cross section, the third region being from a depth of 1500 nm or deeper from the surface of the toner particle $$A1<A2<A3 \quad \text{formula (4)}$$

$$800 \leq A3 \quad \text{formula (5).}$$

7. The toner according to claim 1, having a weight-average particle diameter (D4) of 5.0-10.0 μm.

8. The toner according to claim 1, wherein a dispersity of the inorganic fine particle on the surface of the toner particle is 2.0 nm or less.

9. The toner according to claim 1, wherein the wax contains an ester wax.

10. The toner according to claim 1, wherein the wax contains an ester wax and a hydrocarbon wax.

11. The toner according to claim 1, wherein the inorganic fine particle contains inorganic fine particle (X) having a primary particle major diameter of 60 to 300 nm, and when a coverage (%) of the inorganic fine particle (X) on the surface of the toner particle is defined as X (%), the X (%) and the R2(%) satisfy the following formula (6)

$$X \leq R2 \quad \text{formula (6).}$$

12. The toner according to claim 1, wherein the resin component contains a styrene acrylic resin, and a content of the styrene acrylic resin with respect to a content of the resin component is 80.0%-100.0% by mass.

13. A method for producing a toner comprising the steps of:

(i) forming particles containing a polymerizable monomer and a wax in an aqueous medium;

(ii) polymerizing the polymerizable monomer in the particles to form toner particles;

(iii) holding a dispersion liquid in which the toner particles are dispersed in a temperature range of Ta+15 (° C.) to Ta+35 (° C.), wherein Ta is a crystallization peak temperature of the wax, and then cooling the dispersion liquid from a temperature in the range of Ta+15 (° C.) to Ta+35 (° C.) to a temperature in a range of Ta−35 (° C.) to Ta−20 (° C.), with a cooling rate of 40.0° C./min to 200.0° C./min;

(iv) annealing the dispersion liquid obtained in the step (iii) by holding the dispersion liquid in the temperature range of Ta−35 (° C.) to Ta−20 (° C.) for 30 minutes or more;

(v) removing the toner particles from the dispersion liquid resulting from the step (iv); and (vi) externally adding inorganic fine particles to the toner particles in the temperature range of Ta−35 (° C.) to Ta−20 (° C.).

* * * * *